(12) United States Patent
Yuan et al.

(10) Patent No.: US 9,679,238 B2
(45) Date of Patent: Jun. 13, 2017

(54) RFID TAG ANTENNA, RFID TAG AND PROCESSING METHOD THEREOF

(71) Applicant: Zhongxue Yuan, Shandong (CN)

(72) Inventors: Zhongxue Yuan, Qingdao (CN); Lanfei Dong, Qingdao (CN); Haijun Chen, Qingdao (CN); Qiang Tong, Qingdao (CN); Xuezhi Teng, Qingdao (CN); Yufeng Li, Qingdao (CN); Lichun Wu, Qingdao (CN); Yong Yao, Qingdao (CN); Liyan Ren, Qingdao (CN)

(73) Assignee: MESNAC, Qingdao (CN)

( * ) Notice: Subject to any disclaimer, the term of this patent is extended or adjusted under 35 U.S.C. 154(b) by 6 days.

(21) Appl. No.: 14/654,160

(22) PCT Filed: Dec. 19, 2013

(86) PCT No.: PCT/CN2013/090012
§ 371 (c)(1),
(2) Date: Aug. 19, 2015

(87) PCT Pub. No.: WO2014/094640
PCT Pub. Date: Jun. 26, 2014

(65) Prior Publication Data
US 2015/0356396 A1 Dec. 10, 2015

(30) Foreign Application Priority Data

Dec. 20, 2012 (CN) .......................... 2012 1 0556953
Dec. 20, 2012 (CN) .......................... 2012 1 0557100

(51) Int. Cl.
*G06K 19/06* (2006.01)
*G06K 19/077* (2006.01)
(Continued)

(52) U.S. Cl.
CPC ........ *G06K 19/07754* (2013.01); *B23K 31/02* (2013.01); *G06K 19/07773* (2013.01);
(Continued)

(58) Field of Classification Search
CPC ......... G06K 19/07749; G06K 19/0775; G06K 19/07767; G06K 19/07773;
(Continued)

(56) References Cited

U.S. PATENT DOCUMENTS 7,812,729 B2 * 10/2010 Copeland ........... G06K 19/0726
340/568.1
8,462,077 B2 * 6/2013 Sinnett ................ B60C 23/0493
340/572.1
(Continued)

FOREIGN PATENT DOCUMENTS

CN 201256778 Y 6/2009
CN 201532644 U * 7/2010
(Continued)

*Primary Examiner* — Thien M Le
*Assistant Examiner* — April Taylor
(74) *Attorney, Agent, or Firm* — Jiwen Chen

(57) ABSTRACT

A RFID tag antenna, a RFID tag and a processing method thereof, wherein the RFID tag antenna arranged on the substrate has two parts extending along two different directions. Hence, external forces from far ends of the lateral sides of the substrate or other destructive forces exerting on the welding structure at the welded end of the antenna could be mitigated or attenuated, therefore improving the stress stability and anti-interference performance of the welding structure between the welded end of the antenna and the substrate, and further enhancing the robustness of the RFID tag in the whole life cycle. The RFID tag comprises a substrate, an integrated circuit and a pair of antenna. The antenna has a first part extending along a first direction, wherein the first part having a plurality of continuous spiral rings in a helical form and a second part which is connected
(Continued)

with the first part and extends along a second direction. The arrangement of the second part on the side of the integrated circuit is achieved by welding the second part on the substrate. The first part is being flexible and unrestricted in multiple directions corresponding to the second part.

8 Claims, 3 Drawing Sheets

(51) Int. Cl.
  *H01Q 1/36* (2006.01)
  *B23K 31/02* (2006.01)
  *H01Q 1/22* (2006.01)

(52) U.S. Cl.
  CPC ..... *G06K 19/07786* (2013.01); *H01Q 1/2225* (2013.01); *H01Q 1/362* (2013.01)

(58) Field of Classification Search
  CPC ....... G06K 19/07777; G06K 19/07786; G06K 19/07779; H01Q 1/362
  See application file for complete search history.

(56) References Cited

U.S. PATENT DOCUMENTS

| 2010/0164726 | A1* | 7/2010 | Tada | G06K 19/07749 340/572.7 |
| 2014/0035793 | A1* | 2/2014 | Kato | H01Q 1/243 343/867 |

FOREIGN PATENT DOCUMENTS

| CN | 201532644 U | 7/2010 |
| CN | 102017343 A | 4/2011 |
| CN | 102054194 A | 5/2011 |
| CN | 203025753 U | 6/2013 |
| CN | 201366068 U | 8/2013 |

* cited by examiner

RFID TAG ANTENNA, RFID TAG AND PROCESSING METHOD THEREOF

This is a U.S. national stage application of PCT Application No. PCT/CN2013/090012 under 35 U.S.C. 371, filed Dec. 19, 2013 in Chinese, claiming the priority benefit of Chinese Application No. 201210556953.7, filed Dec. 20, 2012 and Chinese Application No. 201210557100.5, filed Dec. 20, 2012, which are hereby incorporated by reference.

FIELD OF THE TECHNOLOGY

The present invention relates to a radio-frequency identification (RFID) tag capable of being implanted in an information carrier or being attached to its surface, as well as a processing method thereof. The present invention belongs to the technical fields of information, electronics and rubber machinery processing.

BACKGROUND OF THE INVENTION

Today, it is not merely a technical concept of utilizing RFID tags as a carrier of data information or a feedback terminal in logistics, distribution and full life-cycle informatization management of product under the network environment.

Every RFID tag has its own unique identification code. When implanted in an information carrier (such as a tire) or attached to the surface of an information carrier (such as a container), RFID tag could be integrated with information carrier to form a whole without influencing the quality of the carrier negatively. Driven by external read-write equipments, the RFID tag could send, read and write data at any time, as well as supervise the entire process of the carrier in production, sales, utilization, compensation and information monitoring in real time.

In principle, the sending or receiving data of RFID are realized by the connection between antenna and RF module. Due to the fact that a certain degree of flexure or deformation could be occurred in producing and utilizing information carrier, especially for tires, those changes of shape may lead in separation of the antenna and RF module in fracture, breakage and aging. Therefore, it would be an effective way to enhance robustness of RFID tag by improving the fastness of the connection between the antenna and RF module with an intention.

The Chinese Patent Application ZL200920252556.4 in the name of A RFID tag for tire provides an electronic tag with a spiral structure. To be specific, the first step is compressing a welded end of the spiral antenna and then welding the welded end to a RF module in a welded connection. The rest of the spiral antenna still extends to a lateral far end of a substrate helically along the same direction.

The antenna may break off from solder, against the RF module if it is stretched by external forces, exposing to comparatively high ambient temperature or being influenced by other features in the antenna structure disclosed by the patent. Results have been found that a direct stress transfer is formed between the welded end which is compressed and the spiral rings which are extending to the lateral far end with a deficiency of no mitigation or attenuation. Accordingly, damages which are caused by external forces or high ambient temperature to the connection structure between the solder and the welded end could not be effectively avoided.

In light of these flaws, the present patent application is focused on making substantial improvements.

SUMMARY OF THE INVENTION

It is the object of the present invention to overcome the shortcomings of the prior art and to provide a RFID tag and a processing method thereof. The antenna on the substrate provided in the present invention is designed to comprise two parts extending along two different directions. Therefore, external forces transferred from the lateral far end of the substrate or other forces capable of damaging the welded structure could be mitigated or attenuated, so that stress stability and anti-interference properties of the welded connection between the welded end of the antenna and the substrate can be reinforced, and further to improve robustness of the RFID tag in the full life cycle.

In order to fulfill the object described above, the RFID tag antenna has a first part extending along a first direction, wherein the first part has a plurality of continuous spiral rings in a helical form.

Compared with the prior art, the RFID tag antenna further comprises a second part which is connected with the first part and extends helically along a second direction. The second part has one or more complete spiral ring.

Basically, the first part and the second part of the RFID tag extend respectively along the first direction and the second direction. That is to say, the directions of elastic restoration, stretch or compression of the spiral rings which separately consist of the first part and the second part are different.

Upon a welded end is welded onto the substrate, a solid structure as a rivet is formed at the position of the second part. Solder (normally solder paste is formed by soldering) is poured into and fully fills in the inner circle of the spring of the second part. When external forces are transferred from the first part to the second part, namely external forces laterally exerted on the spring rings of the second part, external forces or destructive forces could be mitigated or attenuated at the welded end of the antenna due to the fact that the axis of the spring rings of the second part (consistent with the direction of elastic restoration) is different with the extension direction of the first part, so that the reliability of the welding connection between the antenna and the substrate is substantially improved.

An improved technical solution is adapted for a further enhancement of the stability of a connection structure formed in welding. That is the second part has two or more spiral rings, and the maximum pitch between any two spiral rings of the second part is less than the minimum pitch between any two spiral rings of the first part.

Particularly, that is to say, the spiral rings of the second part are compressed to narrow the gaps between any two of them. The reduction of the gaps can make the solder and the spiral rings connected more tightly in an effective way.

Moreover, the differences between the pitch of the first part and that of the second part cause differences in the vibration frequencies and amplitude under the action of external forces. Hence, the attenuation of external forces can be reinforced at the welded end of the antenna.

In order to make the antenna performed better in data communication, the pitch between any two spiral rings of the first part is provided equally, namely adapting an arrangement structure of spiral rings with equal pitches.

Correspondingly, the pitch between any two spiral rings of the second part is equal.

A preferred embodiment is that the first direction of extension of the first part is perpendicular to the second direction of extension of the second part.

An arranging method of RFID tag antenna based on same object is further disclosed in the present invention which adapts the improved technical solution of RFID tag antenna interpreted above. The arranging method comprises the following steps of:

welding the second part of the RFID tag antenna onto the substrate, while the first part which is continuously connected with the second part extending along the lateral direction of the substrate in a helical form; wherein the second part has one or more complete spiral ring, solder is poured into the inner circle of the second part in welding.

Specifically, the second part has two or more complete spiral rings and the maximum pitch between any two spiral rings of the second part is less than the minimum pitch between any two spiral rings of the first part.

Furthermore, the first direction of extension of the first part may be provided perpendicularly to the second direction of extension of the second part on the surface of the substrate.

A RFID tag is further provided via applying the RFID tag antenna and the arrangement method above. The RFID tag comprises: a substrate, an integrated circuit provided on the substrate and a pair of antennas arranged on both sides of the integrated circuit.

Compared with the prior art, the RFID tag antenna has a first part extending along a first direction, wherein the first part has a plurality of continuous spiral rings in a helical form; a second part which is continuously connected with the first part and extends helically along a second direction, the second part has one or more complete spiral ring.

The arrangement of the antenna on the lateral sides of the integrated circuit can be realized by welding the second part onto the substrate, the first part is being flexible and unrestricted in multiple directions corresponding to the second part.

As basically described above, the first part and the second part of the RFID tag extend respectively along the first direction and the second direction. That is to say, the directions of elastic restoration, stretch or compression of the spiral rings which separately consist of the first part and the second part are different.

After welding the antenna onto the substrate at the position of the second part in a solid connection, the first part is free in multiple directions corresponding to the second part, namely being flexible to bend, stretch and twist elastically. Therefore, when external forces are transferred from the first part to the second part, namely external forces laterally exert on the spring rings of the second part, external forces or destructive forces could be mitigated or attenuated at the welded end of the antenna due to the fact that the axis of the spring rings of the second part (consistent with the direction of elastic restoration) is different with the extension direction of the first part, so that the reliability of the welding connection between the antenna and the substrate is substantially improved.

In order to achieve a further improvement of the stability of the connection structure formed in welding the second part, through holes may be opened at the welding position of the second part on the substrate. Solder for welding the second part is poured into the through holes to form a first rivet structure.

The second part is solidly connected onto the surface of the substrate by solder solidified. Accordingly, a stable connection is formed between the antenna and the substrate in a whole.

As a preferred supplementary improved method, a second rivet structure is formed by pouring solder into the inner circle of the second part in welding. Namely, the second part is fully filled with pouring solder (normally solder paste is formed by soldering), therefore the tightness and stability between the second part and the substrate is improved.

An improved technical solution is adapted for a further enhancement of the stability of a connection structure between solder and the spiral rings of the second part in pouring. That is the maximum pitch between any two spiral rings of the second part is less than the minimum pitch between any two spiral rings of the first part.

Particularly, that is to say, the spiral rings of the second part are compressed to narrow the gaps between any two of them before welding. The reduction of the gaps can make the solder and the spiral rings connected more tightly in an effective way.

Moreover, the differences between the pitch of the first part and that of the second part cause differences in the vibration frequencies and amplitude under the action of external forces. Hence, the attenuation of external forces can be reinforced at the welded end of the antenna.

In order to make the antenna performed better in data communication and simplify the process, the pitch between any two spiral rings of the first part is equal, namely adapting an arrangement structure of spiral rings with equal pitches.

Correspondingly, the pitch between any two spiral rings of the second part is equal.

A preferred embodiment is that the first direction of extension of the first part is perpendicular to the second direction of extension of the second part.

A processing method of RFID tag based on same object of the present invention is further provided via applying improved techniques of RFID tag above. The processing method comprises the following steps of: arranging the integrated circuit on the substrate and assembling a pair of antennas on lateral sides of the integrated circuit.

Compared with the prior art, the processing method is characterized in that further comprises the following steps of: welding the second part with one or more complete spiral ring helically, which is extending along the second direction, to the sides of the integrated circuit.

The first part is being flexible and unrestricted in multiple directions corresponding to the second part.

To be more specific, pouring solder into the inner circle of the second part to form a rivet structure in welding the second part. The second rivet structure is fully filled with the whole body of the second part after welding and a stable connection is formed between one lateral surface of the substrate and the second part.

An improved method for perfecting the stable connection between the second part and the substrate, solder is poured into the through holds opened through the substrate to form a first rivet structure in welding the second part.

Stable connections are formed between the second part and both lateral sides of the substrate.

Moreover, the maximum pitch between any two spiral rings of the second part is less than the minimum pitch between any two spiral rings of the first part.

Additionally, the pitch between any two spiral rings of the first part is equal, and the pitch between any two spiral rings of the second part is equal.

The first direction for extension of the first part is perpendicular to the second direction for extension of the second part.

In conclusion, the RFID tag antenna, RFID tag and process method thereof disclosed in the present invention have following advantages that:

1, the antenna has two parts extending along different directions, therefore the stress stability and anti-interference performance of the welded end of the antenna connected with the substrate is better. Hence, the robustness of the entire RFID tag is substantially improved.

2, the RFID tag with those new features has a more stable performance in data communication.

3, the RFID tag could bear a higher degree of deformation caused by stress or deflection in processing or utilizing.

BRIEF DESCRIPTION OF THE DRAWINGS

Further interpretation will now be described with reference to the accompanying drawings, in which.

Figure 1:
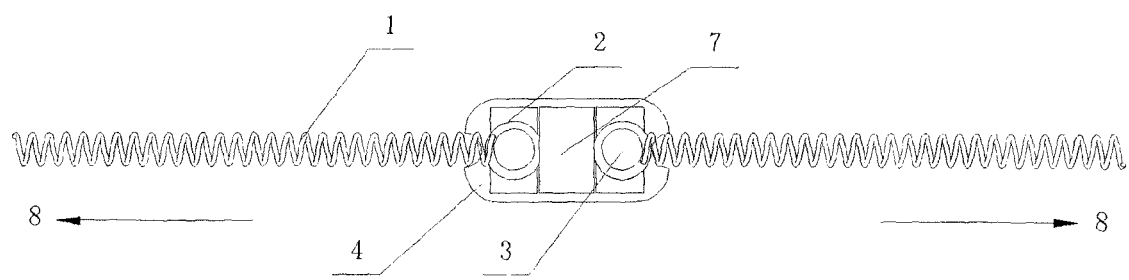
FIG. 1 is a front view of the RFID tag.
Figure 2:
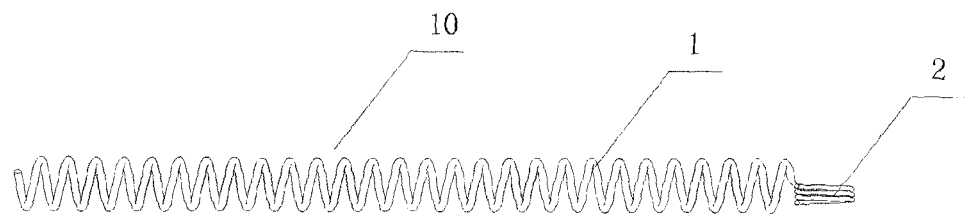
FIG. 2 is a front view of the RFID tag antenna.
Figure 3:
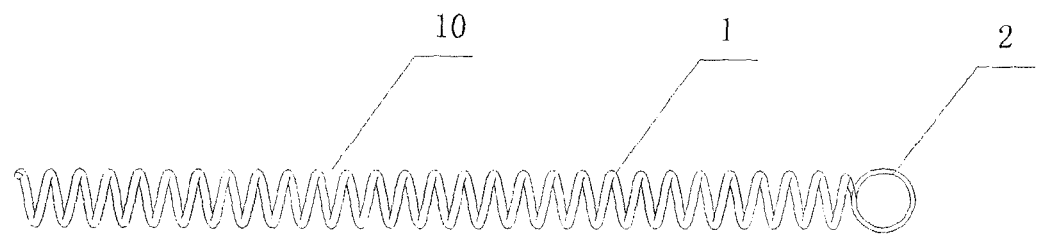
FIG. 3 is a top view of the RFID tag antenna.
Figure 4:
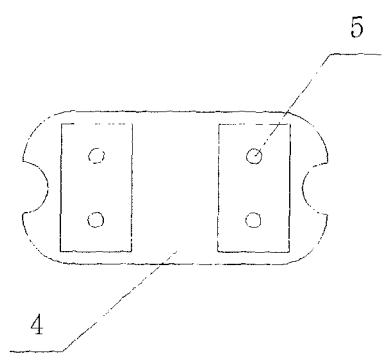
FIG. 4 is a schematic diagram of one lateral side of the substrate surface.
Figure 5:
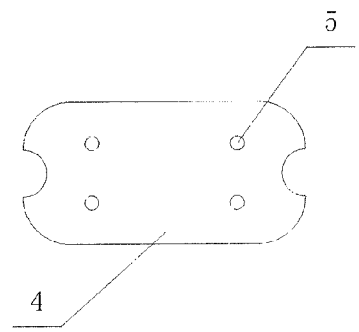
FIG. 5 is a schematic diagram of the other lateral side of the substrate surface.
Figure 6:
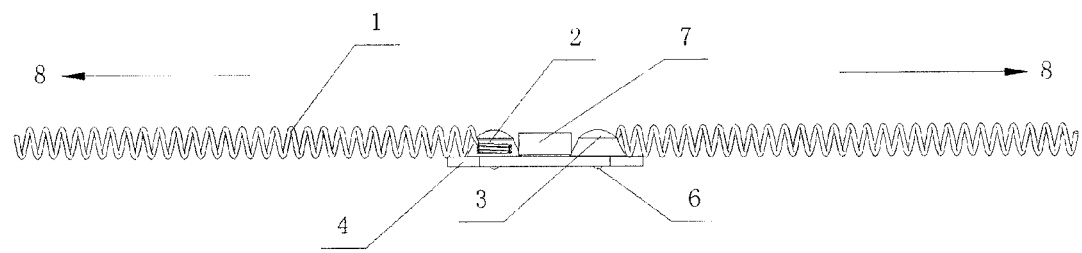
FIG. 6 is a top view of the FIG. 1.

As shown from the FIG. 1 to FIG. 6, the first part 1, the second part 2, the second rivet structure 3, the substrate 4, the through hole 5, the first rivet structure 6, the integrated circuit 7, the direction of force 8, the antenna 10.

DETAILED EMBODIMENT OF THE INVENTION

Further interpretation of the method for preparing a three-dimensional scaffold will now be described with references to embodiments as follows.

Embodiment 1

As shown from the FIG. 1 to FIG. 6, the RFID tag mainly comprises, the substrate 4, the integrated circuit 7 arranged on the substrate 4, and a pair of antenna 10 arranged on both lateral sides of the integrated circuit 7.

Particularly, the antenna 10 has a first part 1 extending along a first direction. The first part 1 has a plurality of continuous spiral rings in a helical form, and the pitch between any two spiral rings of the first part 1 is equal.

A second part 2 that is connected with the first part 1 and extends helically along a second direction, the second part has two or more complete spiral rings. The pitch between any two spiral rings of the second part is equal. The maximum pitch between any two spiral rings of the second part is less than the minimum pitch between any two spiral rings of the first part.

The first direction of extension of the first part is perpendicular to the second direction of extension of the second part.

The arrangement of the antenna 10 on the lateral sides of the integrated circuit 7 is achieved through welding the second part 2 onto the substrate 4. The first part is being flexible and unrestricted in multiple directions corresponding to the second part 2.

The second rivet structure 3 is formed by pouring solder into the inner circle of the second part 2 in welding.

Through holes 5 are opened on the substrate 4 at which the second part 2 is welded. Solder for welding the second part 2 is poured into the through holes 5 to form a first rivet structure 6.

A RFID tag processing method also can be realized on the basis of those improvements of the RFID tag described above. The RFID tag processing method comprises the following steps of:

arranging the integrated circuit 7 on the substrate 4 and assembling a pair of antennas on both sides of the integrated circuit 7.

welding the second part 2 with one or more complete spiral ring helically, which is extending along the second direction, to the lateral sides of the integrated circuit 7, the first part 1 is being flexible and unrestricted in multiple directions corresponding to the second part 2.

Wherein the maximum pitch between any two spiral rings of the second part 2 is less than the minimum pitch between any two spiral rings of the first part 1. The pitch between any two spiral rings of the first part 1 is equal, and the pitch between any two spiral rings of the second part 2 is equal.

The first direction for extension of the first part 1 is perpendicular to the second direction for extension of the second part 2.

Solder is poured into the inner circle of the second part 2 to form the second rivet structure 3 in welding the second part 2. The second rivet structure 3 is fully filled with the whole body of the second part 2 after welding and stable connection is integrated between the lateral side surface of the substrate 4 and the second part 2

Solder is poured through the through holes 5 opened on the substrate 4 to form a first rivet structure 6 in welding the second part 2. Stable connection is formed between both sides of the substrate 4 and the second part 2.

Destructive forces are distributed mainly along the force direction 8, namely extending from the lateral sides of the substrate 4 to far ends after the RFID tag being implanted inside tires. Therefore, the direct transfer of horizontal stress on the antenna can be avoided by adapting the above mentioned improved structure of the antenna, the arranging method for welding the antenna on the substrate, therefore enhancing the overall stress level and the performance of flexure resistance or deformation resistance of the antenna.

The invention claimed is:

1. An antenna of RFID tag having a first part extending along a first direction, wherein the first part having a plurality of continuous spiral rings in a helical form, characterized in that the antenna of RFID tag further comprises a second part, the second part is connected with the first part and extends helically along a second direction; the second art has one or more complete spiral ring, and further characterized in that the second part has two or more complete spiral rings, the maximum pitch between any two spiral rings of the second part is less than the minimum pitch between any two spiral rings of the first part.

2. The antenna of RFID tag according to claim 1, characterized in that the pitch between any two spiral rings of the first part is equal.

3. The antenna of RFID tag according to claim 1, characterized in that the pitch between any two spiral rings of the second part is equal.

4. A RFID tag comprises a board, an integrated circuit provided on the board and a pair of antennas arranged on both sides of the integrated circuit, characterized in that:

the antenna having a first part extending along a first direction, wherein the first part having a plurality of continuous spiral rings in a helical form, and a second part, the second part is connected with the first part and extends helically along a second direction; the second part has one or more complete spiral ring;

the second part being welded to the board to arrange the antenna on the sides of the integrated circuit, the first part is being flexible and unrestricted in multiple directions corresponding to the second part, characterized in that welding paste is poured into the inner circle of the second part to form a second rivet structure in welding, and characterized in that the maximum pitch between any two spiral rings of the second part is less than the minimum pitch between any two spiral rings of the first part.

5. The RFID tag according to claim 4, characterized in that the pitch between any two spiral rings of the first part is equal, and the pitch between any two spiral rings of the second part is equal.

6. The RFID tag according to claim 5, characterized in that the first direction of extension of the first part is perpendicular to the second direction of extension of the second part.

7. A method of processing the RFID tag according to claim 4, comprising the steps of: arranging the integrated circuit on the board and assembling a pair of antennas on both sides of the integrated circuit, characterized in that:

welding the second part with one or more complete spiral ring helically, which is extending along the second direction, to the sides of the integrated circuit the first part is being flexible and unrestricted in multiple directions corresponding to the second part, characterized in that: pouring welding paste into the through holes to form the first rivet structure in welding the second part; stable connection is being integrated between both side surface of the board and the second part, and characterized in that: the maximum pitch between any two spiral rings of the second part is less than the minimum pitch; the pitch between any two spiral rings of the first part is equal, and the pitch between any two spiral rings of the second part is equal.

8. The method of processing the RFID tag according to claim 7, characterized in that, the first direction for extension of the first part is perpendicular to the second direction for extension of the second part.

* * * * *